United States Patent
Sinha et al.

(10) Patent No.: US 12,400,646 B2
(45) Date of Patent: Aug. 26, 2025

(54) AUTOMATIC ONTOLOGY GENERATION FOR WORLD BUILDING IN AN EXTENDED REALITY ENVIRONMENT

(71) Applicant: Meta Platforms Technologies, LLC, Menlo Park, CA (US)

(72) Inventors: Anoop Kumar Sinha, Palo Alto, CA (US); Christopher Towles Lengerich, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 295 days.

(21) Appl. No.: 17/892,868

(22) Filed: Aug. 22, 2022

(65) Prior Publication Data

US 2024/0062751 A1 Feb. 22, 2024

(51) Int. Cl.
| | |
|---|---|
| *G10L 15/19* | (2013.01) |
| *G06F 3/16* | (2006.01) |
| *G06F 40/205* | (2020.01) |
| *G06F 40/30* | (2020.01) |
| *G10L 15/18* | (2013.01) |

(52) U.S. Cl.
CPC .......... *G10L 15/19* (2013.01); *G06F 40/205* (2020.01); *G06F 40/30* (2020.01); *G10L 15/1815* (2013.01); *G10L 15/1822* (2013.01); *G06F 3/167* (2013.01)

(58) Field of Classification Search
CPC . G10L 15/19; G10L 15/1815; G10L 15/1822; G06F 40/205; G06F 40/30; G06F 3/167; G06F 8/75; G06F 40/216; G06F 40/284; G06F 8/31; G06N 3/0455; G06N 3/088; G06N 3/0895; G06N 3/09; G06N 5/025; G06N 5/027; G06N 20/00
USPC .............................................................. 704/9
See application file for complete search history.

(56) References Cited

U.S. PATENT DOCUMENTS

| | | | | |
|---|---|---|---|---|
| 9,858,925 | B2 * | 1/2018 | Gruber | G10L 15/18 |
| 10,073,840 | B2 * | 9/2018 | Hakkani-Tur | G06F 40/40 |
| 2011/0307435 | A1 * | 12/2011 | Overell | G06F 16/367 |
| | | | | 706/46 |
| 2018/0150997 | A1 * | 5/2018 | Austin | G06F 3/0346 |
| 2018/0260304 | A1 * | 9/2018 | Matousek | G06F 11/3644 |
| 2020/0081712 | A1 * | 3/2020 | Lackey, Jr. | G06F 9/54 |
| 2020/0293617 | A1 * | 9/2020 | Luo | G06N 3/08 |

(Continued)

OTHER PUBLICATIONS

Azanzi et al. ("Extracting ontological knowledge from Java source code using Hidden Markov Models") (Year: 2019).*

(Continued)

*Primary Examiner* — Davetta W Goins
*Assistant Examiner* — Fouzia Hye Solaiman
(74) *Attorney, Agent, or Firm* — SEYFARTH SHAW LLP

(57) ABSTRACT

In one embodiment, a method includes receiving code including multiple snippets programmed for manipulating objects in an extended reality environment; using a machine-learning model to learn to identify multiple coding patterns from the multiple snippets programmed for manipulating objects; extracting, based on the multiple coding patterns, object terms and relationships between the object terms used in the multiple snippets; generating an ontology for a natural language model based on the object terms and the relationships, wherein the ontology is configured to be used by the natural language model to parse speech into intents and slots.

18 Claims, 8 Drawing Sheets

(56) References Cited

U.S. PATENT DOCUMENTS

2021/0209304 A1\* 7/2021 Yang ..................... G06F 40/295
2021/0350090 A1\* 11/2021 Cui ........................ G06F 40/58
2022/0005464 A1\* 1/2022 Shen ..................... G06N 3/044
2023/0076767 A1\* 3/2023 Shepal .................... G06N 3/08

OTHER PUBLICATIONS

Bobrow D.G., et al., "GUS, A Frame-Driven Dialog System," Artificial Intelligence, vol. 8, 1977, pp. 155-173, Retrieved from Internet: https://nlp.stanford.edu/acvogel/gus.pdf.

Bolt R.A., "Put-That-There: Voice and Gesture at the Graphics Interface," SIGGRAPH '80: Proceedings of the 7th annual conference on Computer graphics and interactive techniques, Jul. 1980, pp. 262-270.

European Search Report for European Patent Application No. 23185593.3, dated Jan. 25, 2024, 16 pages.

Office Action mailed Apr. 8, 2025 for European Patent Application No. 23185593.3, filed on Jul. 14, 2023, 15 pages.

\* cited by examiner

AUTOMATIC ONTOLOGY GENERATION FOR WORLD BUILDING IN AN EXTENDED REALITY ENVIRONMENT

TECHNICAL FIELD

This disclosure generally relates to world building of an extended reality environment and, more specifically, to automatic ontology generation in world building of an extended reality environment.

BACKGROUND

World building in an extended reality (XR) environment is the fundamental core of metaverse experience in the future. Creating three-dimensional (3D) scenes involves generating numerous elements (e.g., background, sound, static object, an animated object). However, it is sophisticated to create 3D scenes due to the complexity of script languages used to create elements with different attributes. Such complexity may also include technical difficulties such as 3D spatial positioning issues. In order to achieve 3D scene world building, specialized software tools are frequently needed, and significant programming expertise is required. There exist varieties of built 3D or 3D scenes with massive 3D objects associated with the 3D scenes in extended reality applications, where the programs for generating such scenes and objects are well established and error-free.

Program synthesis leads to a growing new wave of technologies of artificial intelligence (AI) automatically finding executable programs that satisfy high-level specifications. Natural language interfaces (NLIs) and gestures input interfaces are fundamentals for manipulating 3D scenes and objects in world building in the extended reality programming environment. In particular, the natural language voice interface may be used for creating 3D objects by virtue of that natural language input is intuitive for clients such as users, developers, or world building artists to provide an objective of acting on an object at a high-level specification. Therefore, it may be helpful to provide techniques to reduce the programming effort of creating 3D scenes by adopting programming synthesis with natural language interfaces.

SUMMARY OF PARTICULAR EMBODIMENTS

In particular embodiments, a user may use voices through a natural language interface in an extended reality environment. A natural language (NL) model of the natural language interface may enable the user to create 3D scenes using a natural language input. The NL model may use an ontology when semantically parsing the natural language input. The ontology may enable the NL model to obtain object terms from the ontology to determine intents and slots when parsing the natural language input. A machine learning model may automatically generate the ontology that may provide the NL model understanding when parsing the natural language input in the extended reality environment. As an example and not by way of limitation, extended reality applications may comprise well-established 3D scenes that comprise various objects within the 3D scenes. The machine learning model may obtain code programmed for manipulating objects within the extended reality applications in the extended reality environment. The code may comprise snippets associated with manipulating each object, and the snippets may comprise programs of functions that generate actions to manipulate objects (such as create, delete, color, transport) and strings that represent the objects. In particular embodiments, the code may comprise actual English words (such as tree, window, ball), a random combination of letters and/or numbers, or gibberish. In particular embodiments, the snippets may further comprise attributes of each object (such as color, shape, size, texture).

In particular embodiments, subsequent to receiving the code comprising a plurality of snippets programmed for manipulating objects in the extended reality environment, the machine learning model may learn to identify a plurality of coding patterns from the plurality of snippets programmed for manipulating objects. As an example and not by way of limitation, the machine learning model may learn a coding pattern of creating an object in the extended reality environment and may identify all snippets being fed to the machine learning model with the same pattern for creating an object. In particular embodiments, the machine learning model may also learn to identify coding pattern that that identify certain specific types of objects. As an example and not by way of limitation, the machine learning model may identify all snippets with the same pattern for naming an object among the code fed to the machine learning model. The object may be named using actual English words reflecting itself in the 3D scene, or the object may be named using a random representation. As an example and not by way of limitation, the code may comprise snippets associated with manipulating a tree in the extended reality environment, and the object "tree" may be named in the programs using "tree," "T," or "t1234."

In particular embodiments, the machine learning model may extract object terms and relationships between the object terms used in the plurality of snippets based on the plurality of identified coding patterns. As an example and not by way of limitation, the machine learning model may extract objects terms such as the objects themselves (e.g., tree, window, apple, beach), actions that may operate on the objects (e.g., add, get, delete, create), and attributes of the objects (e.g., color, shape, size, texture). The machine learning model may also extract the particular snippets of code and features associated with the object terms. The machine learning model may determine the relationship between the object terms based on the patterns that the original code is programmed. As an example and not by way of limitation, the machine learning model may determine that an action object term (e.g., create) may operate on an object (e.g., tree) since their code is linked.

In particular embodiments, the machine learning model may generate an ontology for a natural language model based on the object terms and the relationships. In particular embodiments, the machine learning model may cluster the object terms based on the relationships to construct an ontology. In particular embodiments, the natural language model may use the ontology to parse a natural language input into intents and slots. The natural language model may receive a natural language input that may comprise more than one phrase. The NL model may semantically parse each of the more than one phrases respectively to determine intents and slots for each phrase. The NL model may generate atomic application programming interface (API) definitions according to the parsed intents and slots for each phrase. In particular embodiments, the NL model may determine a suggested meaning for every single word of the phrases according to the object terms of the ontology, where the intents and slots may be filled with the object terms of the ontology.

Certain technical challenges exist for world building in the extended reality environment. one technical challenge may include reducing redundant programming effort in creating 3D objects when creating 3D scenes. The solution presented by the embodiments disclosed herein to address this challenge may be using program synthesis to obtain suggested code based on a high-level specification through parsing a natural language input according to an ontology, where the ontology is generated using object terms extracted from the origins of the suggested code. Another technical challenge may include lessen the requirement of manual intervention in ontology generation. The solution presented by the embodiments disclosed herein to address this challenge may be using the machine learning model to learn the object terms and the relationships according to programs fed to the machine learning model. The machine learning model may automatically generate the ontology; thereby, objects that existed in the original programs may be identified for following coding patterns and added to the ontology automatically.

Certain embodiments disclosed herein may provide one or more technical advantages. A technical advantage of the embodiments may include reduced duplication of effort as the machine learning model may allow the users to benefit from programs already written for creating 3D scenes in the extended reality environment. The users may leverage the specifications, examples, and instructions within all the written scripts for world building to reduce programming effort in manipulating objects. Another technical advantage of the embodiments may include more efficient ontology generation as the machine learning model may automatically extract object terms and generate the ontology for natural language semantic parsing compared to linguists manually cluster vocabularies and construct ontologies. Another technical advantage of the embodiments may include more features for users to choose from when creating a 3D scene, as the ontology may provide all the possible suggestions according to users' voice input. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Automatic Ontology Generation System

Figure 1:
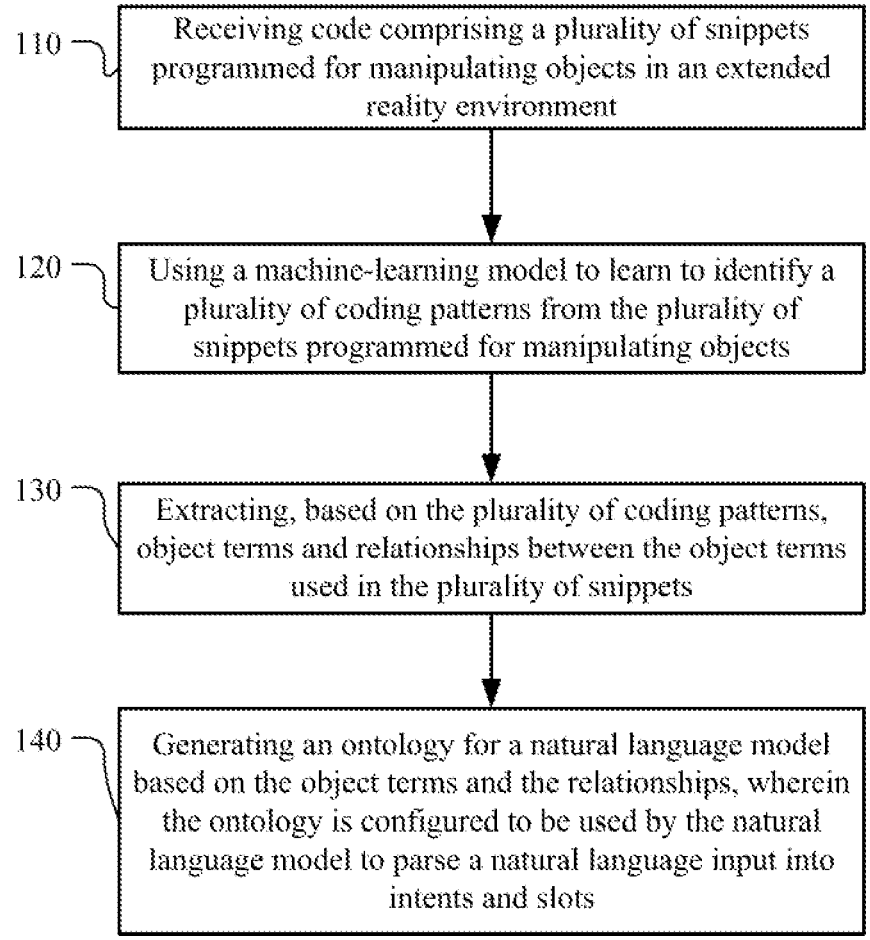
FIG. 1 illustrates an example method for automatic ontology generation for worlding building in an extended reality environment.

FIG. 1 illustrates an example method 100 implemented by a computing system for automatic ontology generation for worlding building in an extended reality environment. The method may begin at step 110, where receiving code comprising a plurality of snippets programmed for manipulating objects in an extended reality environment. At step 120, using a machine-learning model to learn to identify a plurality of coding patterns from the plurality of snippets programmed for manipulating objects. At step 130, extracting, based on the plurality of coding patterns, object terms and relationships between the object terms used in the plurality of snippets. At step 140, generating an ontology for a natural language model based on the object terms and the relationships, wherein the ontology is configured to be used by the natural language model to parse a natural language input into intents and slots. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for automatic ontology generation for worlding building in an extended reality environment including the particular steps of the method of FIG. 1, this disclosure contemplates any suitable method for automatic ontology generation for worlding building in an extended reality environment including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In particular embodiments, the machine learning model may receive code programmed for extended reality applications. The code may comprise snippets programmed for manipulating objects in an extended reality environment. The code may comprise snippets associated with varieties of manipulations of varieties of objects. The snippets may comprise programs of functions that generate actions to manipulate objects (such as create, delete, color, transport) and strings that represent the objects. In particular embodiments, the strings in the code may be actual English words (such as tree, window, ball), a random combination of letters and/or numbers, or gibberish. In particular embodiments, the snippets may further comprise features of the objects to be manipulated. For example, in the programs for creating a 3D blanket, the code snippet associated with the blanket may comprise code for rendering the features (such as color, shape, size, texture, pattern) of the 3D blanket in the extended reality environment.

In particular embodiments, subsequent to receiving the code comprising a plurality of snippets programmed for manipulating objects in the extended reality environment, the machine learning model may learn to identify a plurality of coding patterns from the plurality of snippets programmed for manipulating objects. As an example and not by way of limitation, the machine learning model may learn a coding pattern of creating an object in the extended reality environment and may identify all snippets being fed to the machine learning model with the same pattern for creating an object. In particular embodiments, the machine learning model may also learn to identify coding pattern that names objects. As an example and not by way of limitation, the machine learning model may identify all snippets fed to the machine learning model with the same pattern for naming an object. The object may be named using an actual English word reflecting itself in the 3D scene, or the object may be named using a random representation. As an example and not by way of limitation, the code may comprise snippets associated with manipulating a tree in the extended reality environment; the object "tree" may be named in the programs using "tree," "T," or "t1234" (gibberish).

In particular embodiments, the machine learning model may use a semi-supervised neural network to learn coding patterns. For example, a portion of the plurality of code snippets may be labeled. The machine learning model may use the preprocessed code snippets as training data to determine patterns and identify portions from the code snippets the machine learning model may extract as object terms for the ontology. TABLE A is an example training process with a labeled code snippet. The example code shown in TABLE A is provided solely to illustrate clear examples of the application of the principles of this disclosure and not to limit the scope of the appended claims to these particular examples. In other embodiments, an alternative learning process (e.g., unsupervised neural network learning) may be used to implement the functions of the machine learning model to determine object terms for the ontology.

TABLE A

Example Training Process

```
addEntity(command);    // TAG: FUNCTION>CREATE
    addEntity("tree")
    addEntity("drink")
    addEntity("blanket")
void addEntity(string command) {
    if(command.find("tree") != std::string::npos) {
        Entities( )
            .position(vec3{10, -10, 20})
            .entity(Entity::Tree);    // TAG: ENTITY>TREE
        std::cout << "added entity for TREE" << std::endl;
    } else if(command.find("drink") != std::string::npos) {
        Entities( )
            .position(vec3{5, -5, 5})
```

TABLE A-continued

Example Training Process

```
            .entity(Entity::Drink);    // TAG: ENTITY>DRINK
        std::cout << "added entity for DRINK" << std::endl;
    } else if(command.find("blanket") != std::string::npos) {
        Entities( )
            .position(vec3{0, 0, 5})
            .entity(Entity::Blanket);    // TAG: ENTITY>BLANKET
        std::cout << "added entity for BLANKET" << std::endl;
    } else {
        std::cout << "Unsupported entity for: " << command << std::endl;
    }
}
```

In TABLE A, a repeated pattern "addEntity(command)" is found and is labeled with annotations "//TAG: FUNCTION>CREATE" indicating such pattern is a "create" type function. Other types of functions (such as delete and update) may also be labeled. Similarly, another repeated pattern "Entity::Object" is labeled with annotations that indicate the object in English word that is being manipulated. For example:

```
    .entity(Entity::Tree);      // TAG: ENTITY>TREE
    .entity(Entity::Drink);     // TAG: ENTITY>DRINK
    .entity(Entity::Blanket);   // TAG: ENTITY>BLANKET
```

The machine learning model may learn "addEntity(command)" and "Entity::Object" coding patterns according to ground truth that are labeled with annotations and able to identify the same pattern elsewhere in the plurality of code snippets without the labels. For example, if the machine learning model finds "Entity::window" in another code snippet, even if without any labels, the machine learning model may be able to identify the coding pattern that indicates an object "window." If the machine learning model finds "Entity::t1234" in another code snippet, even if without any labels and neither does "t1234" reflect any actual objects in English, the machine learning model may identify the coding pattern that indicates an object "t1234." In some embodiments, the training code that is being fed to the machine learning model may have no annotations. Under such circumstances, the machine learning model may use an unsupervised neural network to learn coding patterns. Although this disclosure describes identifying a creation function in a particular manner, this disclosure contemplates any suitable function in any suitable manner.

In particular embodiments, the machine learning model may extract object terms and relationships between the object terms used in the plurality of snippets based on the plurality of identified coding patterns. The machine learning model may extract object terms such as names of the functions to manipulate objects. The functions may be programmed to realize performing actions on objects such as create function, delete function, color functions. As an example and not by way of limitation, once identifying the coding pattern "addEntity(command)," the machine learning model may extract the function name as a create action "addEntity." The machine learning model may extract object terms such as objects themselves from the coding patterns. As an example and not by way of limitation, once identifying the coding pattern "Entity::," what follows may be extracted by the machine learning model as objects "tree," "drink," and "blanket." In particular embodiments, the programmers may use a random representation for a 3D object, and the random representation may be gibberish (e.g., t1234). The gibberish may be extracted in its original format in the string used in the code.

In particular embodiments, the machine learning model may further extract features associated with the objects. For example, the original code may comprise code programmed associated with features of building the 3D object "blanket," such as color, shape, size, texture, and pattern.

In particular embodiments, the machine learning model may further extract a particular code snippet associated with a particular object term of the ontology, wherein the particular code snippet is accessible when the particular object term is identified as intents and slots by the natural language model. The extracted code may be saved to a library of code.

In particular embodiments, the machine learning model may determine relationships between the object terms based on the patterns that the original code is programmed. Such relationships may reflect ways that the object terms may be clustered. As an example and not by way of limitation, one kind of the relationships may be that the extracted object term "addEntity" is a creation function that may operate on the object term "tree." The object terms "addEntity" and "tree" in the original code are linked to each other at least in "addEntity("tree")," which indicates "tree" is the parameter to be passed to the "addEntity" function (the entity being added is a tree). The object term "addEntity" may also operate on "drink," "blanket," "window," "t1234," etc. Another kind of the relationships may be that one object term may have multiple features. For example, the original programs for creating a 3D blanket may comprise code snippets that generate each feature of the 3D blanket, including color, shape, size, texture, pattern, etc. Another kind of the relationships may be that one object term may be a sub-category of another object term. For example, the object term "beer" may be a sub-category of "drink," the subject term "color" may include multiple colors in its sub-categories, and each color may further include different shades.

In particular embodiments, the machine learning model may output specific English words such as "tree," "window," "drink," and "building." In particular embodiments, the machine learning model may output a dictionary that includes a list of extracted object terms. There may be possibilities that a parsed input of words (parsed from audio/verbal input or nonverbal input, such as vision, location, gesture, motion, or hybrid/multi-modal input) may be matched to the object terms of the dictionary. In particular embodiments, the machine learning model may output an embedding space of numeral vectors for word morphing. In particular embodiments, the machine learning model may output words in a structured format (e.g., XML, JSON).

In particular embodiments, the users may perform cleaning of meaningless words in the extracted object terms such as "t1234" to align a collection of extracted object terms to natural language. In particular embodiments, library capabilities may be increased by extracting and retaining gibberish words, where the gibberish words may reflect some customized items in world building.

In particular embodiments, the machine learning model may generate an ontology for a natural language model based on the object terms and the relationships, wherein the ontology is configured to be used by the natural language model to parse a natural language input into intents and slots. In particular embodiments, the machine learning model may cluster the object terms based on the relationships to construct an ontology. The ontology generated based on the object terms and the relationships may comprise concepts of a plurality of actions and objects. The ontology may define that each of the plurality of actions may operate on one or more of the plurality of objects. The actions of the ontology may correspond to the names of the functions in the code programmed for manipulating objects. In particular embodiments, the ontology may aggregate action functions that are programmed to realize similar goals with different object terms. For example, the identified patterns for creating an object (e.g., FUNCTION>CREATE) may include "addEntity( )" "createEntity( )" "generateEntity( )" etc. All of the object terms "addEntity," "createEntity," and "generateEntity" may be extracted and added to the ontology. The object terms of actions may link to objects extracted from the original code that are the parameters passed to each function. When parsing the natural language input, the object terms of action in the ontology may be classified with a specific domain (e.g., creation, deletion, update, etc.) for the NL model.

In particular embodiments, the ontology may further comprise concepts of a plurality of attributes associated with the objects. The ontology may define that each of the plurality of objects may comprise one or more of the plurality of attributes. The attributes of the ontology may correspond to the features of the objects. In the code fed to the machine learning model, the features may be programmed to link to the object that owns the features. In particular embodiments, an object may be created with different features in different snippets, and the ontology may aggregate available attributes to the object to increase the library capabilities of manipulating objects. As an example and not by way of limitation, in one snippet, the object "ball" may be programmed with rubber material and red color; in another snippets, the object "ball" may be programmed with leather material and green color. The ontology may aggregate "rubber" and "leather" to the attribute material and "red" and "green" to the attribute color associated with one object term "ball" in the structure of the ontology. The ontology may further aggregate the attributes from different objects. As an example and not by way of limitation, the ontology may aggregate all features related to the attribute material for different objects to the material associated with the ball, and may aggregate different shades of colors to expand the library capabilities and enable customizable items.

In particular embodiments, the ontology may comprise objects and sub-categories associated with the objects. Developers may create massive varieties of objects in the code, where the varieties of each object may be sub-categories of each object. The ontology may link each sub-category to the object based on that the code where the object terms of each sub-category are extracted relates to the code where a higher hierarchy object are extracted (e.g., within a code snippet). The ontology may also link the object terms of actions to the object terms of sub-categories based on that the code for action functions are linked to the varieties of objects in the code snippets fed to the machine learning model. As an example and not by way of limitation, in a 3D scene like a forest, there may be massive varieties of trees (e.g., birch, pine, maple, oak, etc.) generated under a category of "tree." The ontology may aggregate all kinds of trees into a single ontology. The ontology may link each of birch, pine, maple, and oak to the higher hierarchy object term "tree." In particular embodiments, the higher hierarchy object term "tree" may further link to the object terms of actions of the ontology. In particular embodiments, the varieties of objects may directly link to the object terms of actions without linking to the higher hierarchy of concepts related to a real object (e.g., tree). For example, "addEntity" links to "oak" in the generated ontology.

Figure 2:
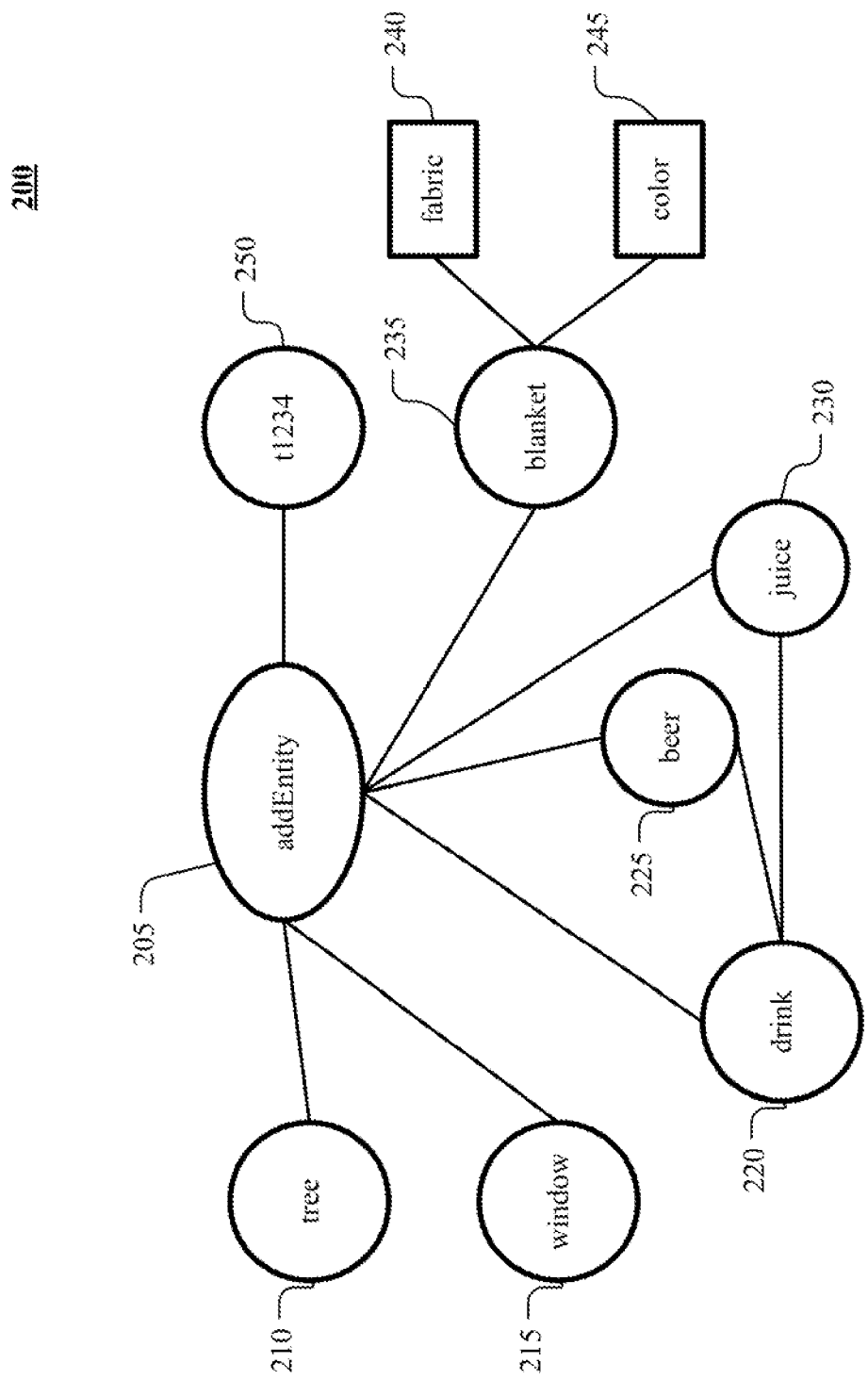
FIG. 2 illustrates an example automatically generated ontology structure.

FIG. 2 illustrates an example automatically generated ontology structure. The machine learning model may identify a coding pattern for creating a new object, where the coding pattern may be a function programmed with a function name "addEntity":

addEntity (command)

The machine learning model may extract the object term "addEntity" 205, and may link the action "addEntity" 205 to multiple extracted objects based on a binary relationship (e.g., operates on). The objects extracted from a plurality of code snippets being operated on may include "tree" 210, "window" 215, "drink" 220, "beer" 225, "juice" 230, "blanket" 235, and "t1234" 250, where the object terms may be extracted from the identified pattern:

Entity::Object

Even if "t1234" doesn't have an English meaning in representing a known object to users, the object term "t1234" may still be added to the ontology with the code associated with creating "t1234" saved to the library for access when "t1234" is called. The object term "drink" 220 may link to the object term "beer" 225 and "juice" 230 based on the relationship that "beer" 225 and "juice" 230 are sub-categories of "drink" 220. The object term "blanket" 235 may further link to attributes "fabric" 240 and "color" 245, where one or more values may be aggregated for each attribute. Although this disclosure describes particular object terms clustering for generating the ontology in a particular manner, this disclosure contemplates any suitable object terms clustering for generating the ontology in any suitable manner.

In particular embodiments, subsequent to generating the ontology for a natural language model based on the object terms and the relationships, the ontology may be used by the natural language model to parse a natural language input into intents and slots.

Figure 3:
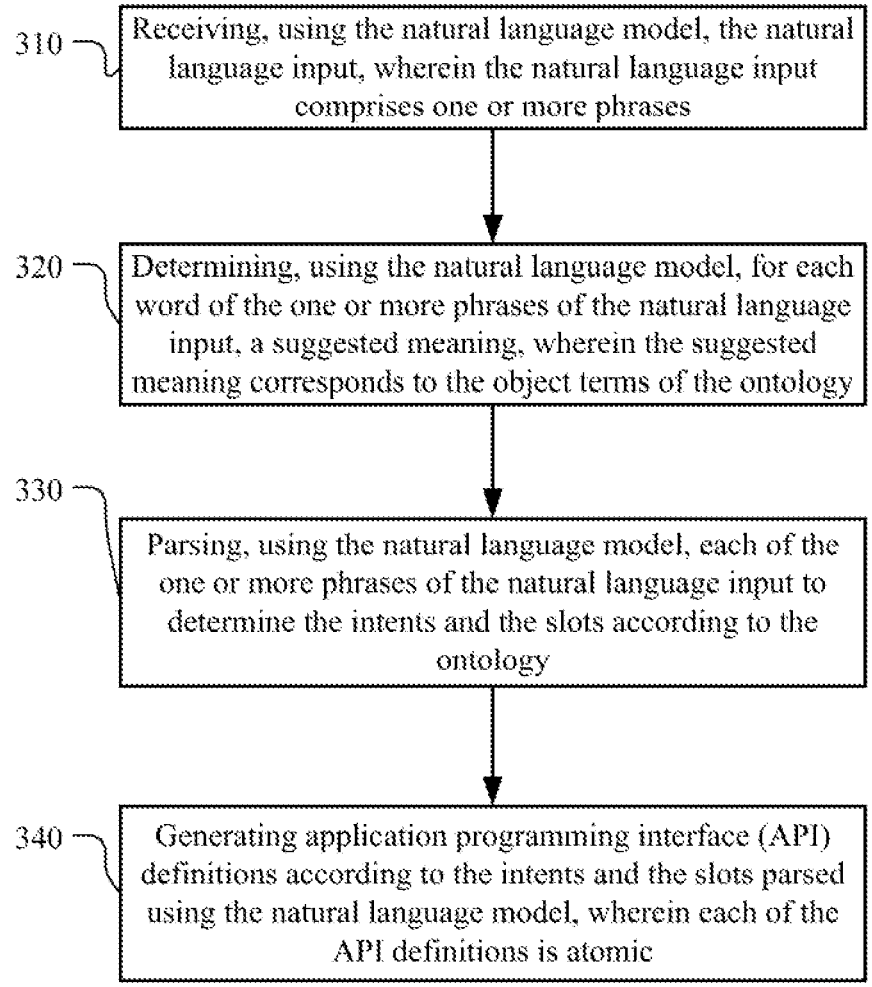
FIG. 3 illustrates an example method for world building using natural language input based on the ontology.

FIG. 3 illustrates an example method 300 for world building using natural language input based on the ontology. The method may begin at step 310, where receiving, using the natural language model, the natural language input, wherein the natural language input comprises one or more phrases. At step 330, parsing, using the natural language model, each of the one or more phrases of the natural language input to determine the intents and the slots according to the ontology. At step 340, generating application programming interface (API) requests according to the intents and the slots parsed using the natural language model, wherein each of the API requests is atomic. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for world building using natural language input based on the ontology including the particular steps of the method of FIG. 3, this disclosure contemplates any suitable method for world building using natural language input based on the ontology including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In some embodiments, the method 300 for world building using natural language input based on the ontology may further comprise step 320, where subsequent to receiving the natural language input comprising one or more phrases, the natural language model may determine, for each word of the one or more phrases of the natural language input a suggested meaning corresponds to the object terms of the ontology automatically generated by the machine learning model. As an example and not by way of limitation, the natural language model may receive a speech "create a tree in the corner." The natural language model semantically parses each word in this phrase according to the ontology automatically generated by the machine learning model. The NL model may access the ontology and look for exact same word among the object terms in the ontology, or the object terms in the ontology that have a related meaning. As a result, "create" is mapped to the object term "addEntity" that indicates a type of actions to manipulating objects; and "tree" is mapped to the object term "Entity::tree" that indicates the object as built in the extended reality applications. In addition, the NL model may determine a specific domain according to the received phrase that the intent is "creation" Therefore when the user provides a speech "create a tree in the corner," the NL model parses the speech into intent and slots according to the ontology:

create=>addEntity
tree=>Entity::tree
Corner=>location (10, 10, 10)
INTENT=>creation The NL model may generate an API request according to the parsed intent and slots. In particular embodiments, an API response associated with the API request may comprise suggested code for manipulating objects in the extended reality environment.

In particular embodiments, the machine learning model may further extract a particular code snippet associated with a particular object term of the ontology, wherein the particular code snippet is accessible when the particular object term is identified as intents and slots by the natural language model. In particular embodiments, the machine learning model may further extract particular snippets of code that are associated with the object terms. The extracted code may be saved to a library of code and may be provided in the API response when the API request comprises the object terms associated with the code.

In particular embodiments, the natural language input may comprise more than one phrase. For example, the user may provide a speech including "put a beach chair on the beach and put an umbrella, make the umbrella yellow and put a beach ball on the beach." The natural language model will parse the speech phrase by phrase and send atomic API requests for each phrase of "put a beach chair on the beach," "put an umbrella," "make the umbrella yellow," and "put a beach ball on the beach" to obtain suggested programs for manipulating the objects in the code library as an atomic unit.

In particular embodiments, the NL model may be able to parse gibberish according to the automatically generated ontology. As an example and not by way of limitation, the natural language input may be "create t1234," without knowing what "t1234" is, the NL model may search for the object term "t1234" based on the ontology. The code comprising a plurality of snippets programmed for manipulating objects fed to the machine learning model may comprise a snippet that generates a customized object that "t1234." The object term "t1234" is passed as the parameter for a creation function programmed. The machine learning model may extract and add the object term "t1234" to the automatically generated ontology so that the NL model may parse the natural language "t1234" to match the object term "t1234" provided by the ontology. The machine learning model may identify the code where the object term "t1234" is extracted, and the code may be provided to the user when the user says, "create t1234," and may render what is created as "t1234" in the existed extended reality applications. Abilities of parsing gibberish based on the ontology may enable increasing the library capabilities and enriching the vocabulary of the automatically generated ontology through the aggregation of objects that previous users or developers have customized.

Figure 4:
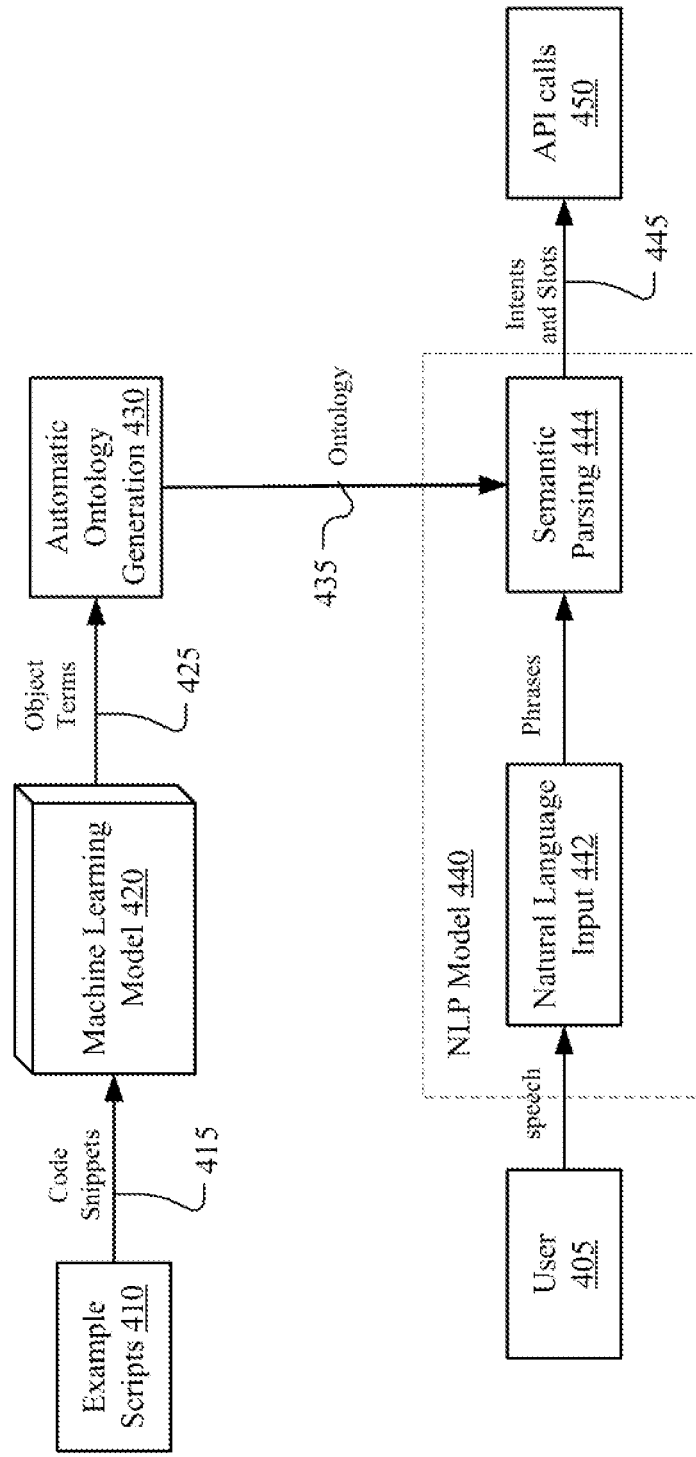
FIG. 4 illustrates an example process of integrating the machine learning model and the natural language model.

FIG. 4 illustrates an example process of integrating the machine learning model and the natural language model. As an example and not by way of limitation, example scripts 410 may comprise a plurality of snippets 415 programmed for manipulating objects in an extended reality environment. The machine learning model 420 may receive code snippets 415 and learn to identify a plurality of coding patterns from the plurality of snippets 415 programmed for manipulating objects. The machine learning model 420 may extract object terms 425 and relationships between the object terms used in the plurality of snippets 415 based on the plurality of coding patterns. The machine learning model 420 may automatically perform ontology generation 430 based on the object terms 425 and the relationships and provide an ontology 435. The ontology 435 may be configured to be used by the natural language model 440 to parse a natural language input 442 provided by a client through a client system into intents and slots 445. The natural language model 440 may generate application atomic API requests 450 according to the intents and the slots 445 parsed using the natural language model 440.

System Overview

Figure 5:
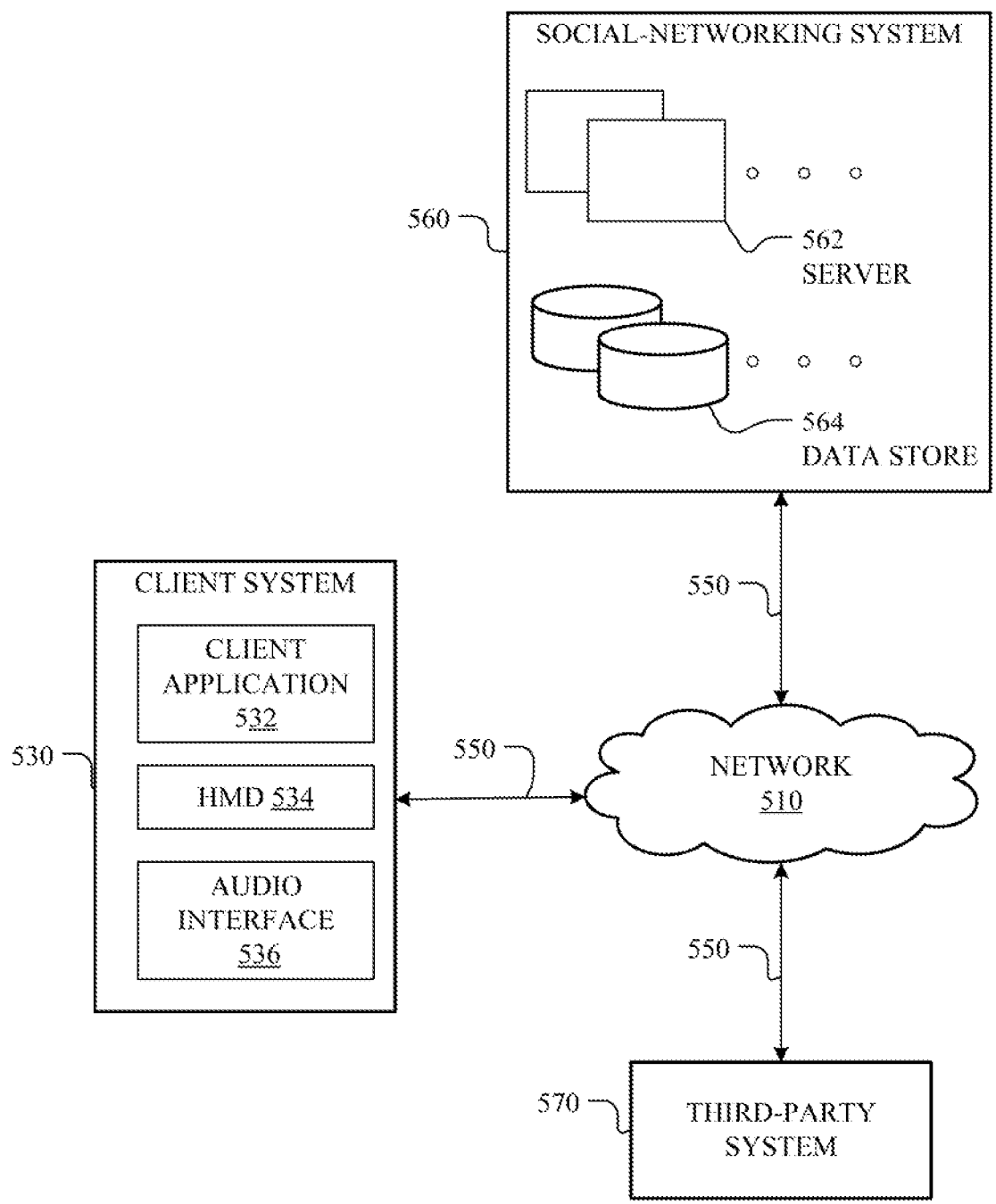
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a client application 532, and may have one or more add-ons, plug-ins, or other extensions. A user at client system 530 may enter a Uniform Resource Locator (URL) or other address directing the client application 532 to a particular server (such as server 562, or a server associated with a third-party system 570), and the client application 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a client application 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Vector Spaces and Embeddings

Figure 6:
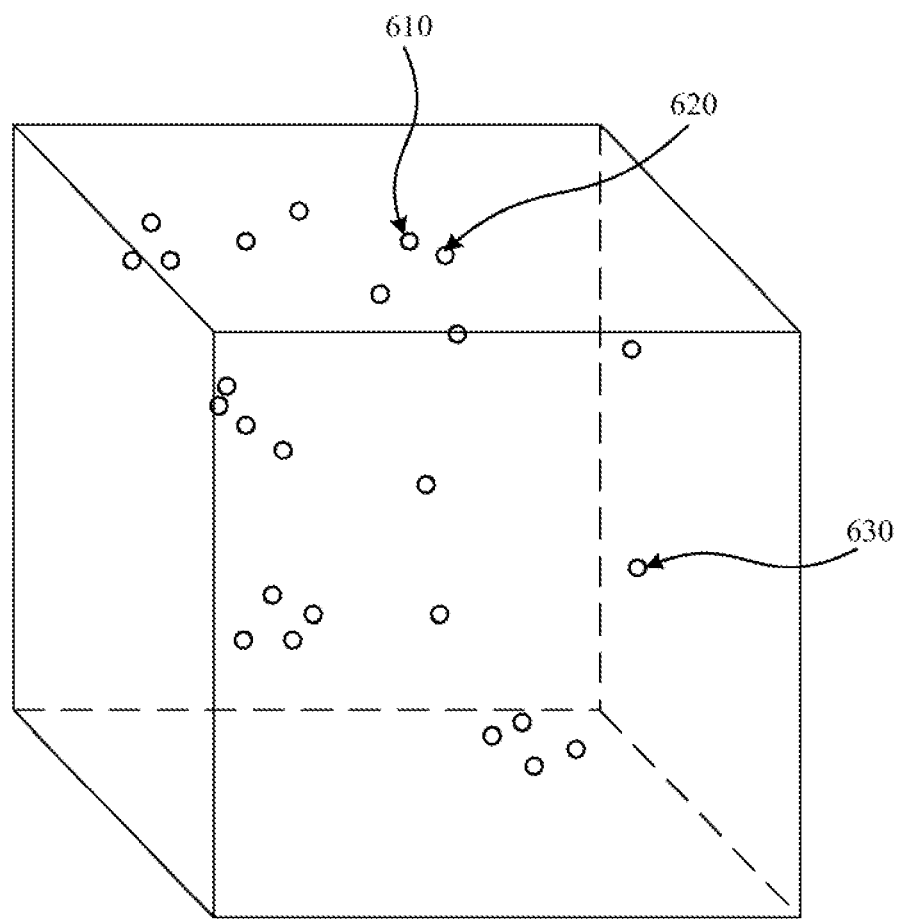
FIG. 6 illustrates an example view of an embedding space.

FIG. 6 illustrates an example view of a vector space 600. In particular embodiments, an object or an n-gram may be represented in a d-dimensional vector space, where d denotes any suitable number of dimensions. Although the vector space 600 is illustrated as a three-dimensional space, this is for illustrative purposes only, as the vector space 600 may be of any suitable dimension. In particular embodiments, an n-gram may be represented in the vector space 600 as a vector referred to as a term embedding. Each vector may comprise coordinates corresponding to a particular point in the vector space 600 (i.e., the terminal point of the vector). As an example and not by way of limitation, vectors 610, 620, and 630 may be represented as points in the vector space 600, as illustrated in FIG. 6. An n-gram may be mapped to a respective vector representation. As an example and not by way of limitation, n-grams $t_1$ and $t_2$ may be mapped to vectors $\vec{v_1}$ and $\vec{v_2}$ in the vector space 600, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 600. In particular embodiments, an n-gram may be mapped to a vector representation in the vector space 600 by using a machine leaning model (e.g., a neural network). The machine learning model may have been trained using a sequence of training data (e.g., a corpus of objects each comprising n-grams).

In particular embodiments, an object may be represented in the vector space 600 as a vector referred to as a feature vector or an object embedding. As an example and not by way of limitation, objects $e_1$ and $e_2$ may be mapped to vectors $\vec{v_1}$ and $\vec{v_2}$ in the vector space 600, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 600. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 600. As an example and not by way of limitation, vector 610 and vector 620 may correspond to objects that are more similar to one another than the objects corresponding to vector 610 and vector 630, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 7:
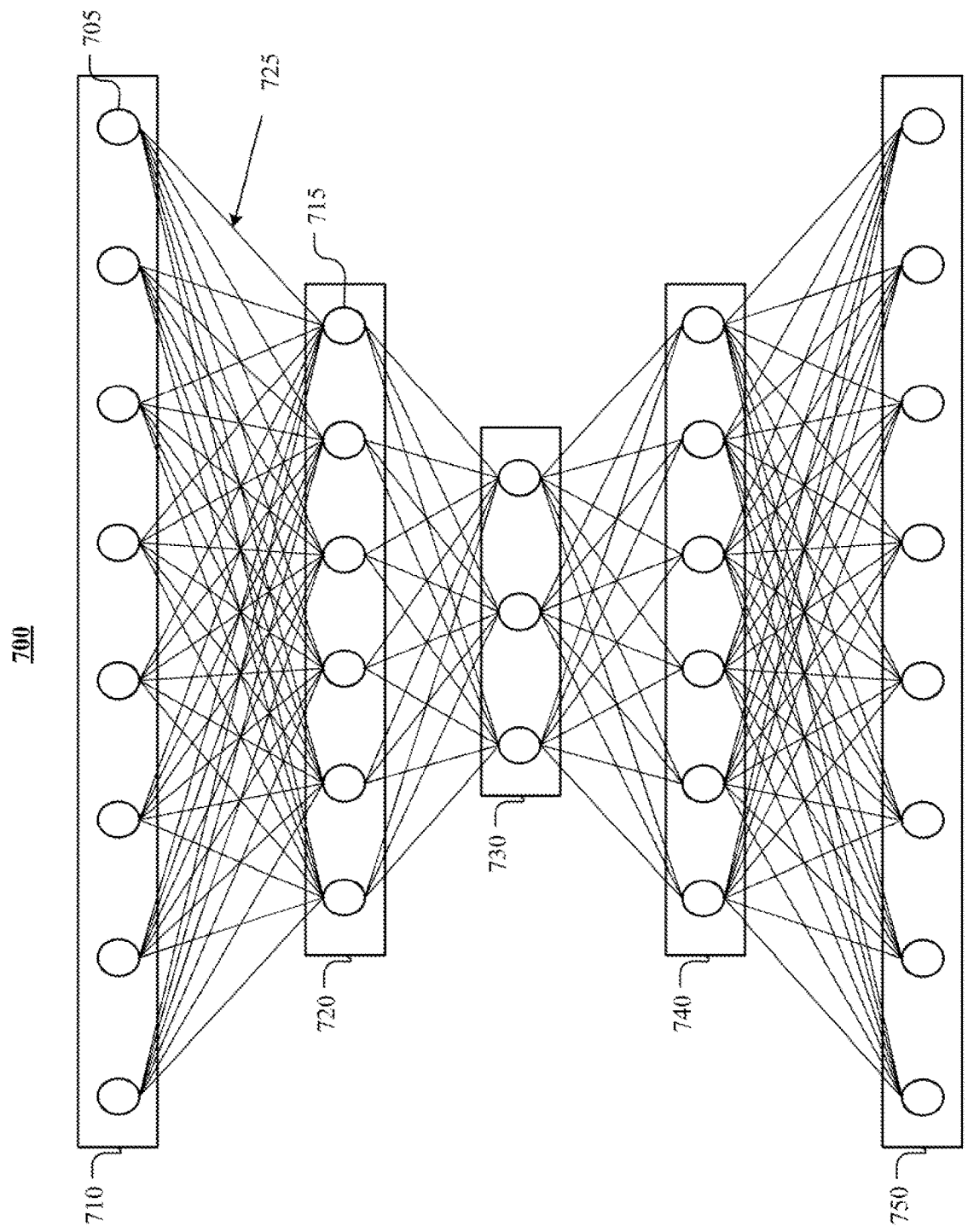
FIG. 7 illustrates an example artificial neural network.

FIG. 7 illustrates an example artificial neural network ("ANN") 700. In particular embodiments, an ANN may refer to a computational model comprising one or more nodes. Example ANN 700 may comprise an input layer 710, hidden layers 720, 730, 740, and an output layer 750. Each layer of the ANN 700 may comprise one or more nodes, such as a node 705 or a node 715. In particular embodiments, each node of an ANN may be connected to another node of the ANN. As an example and not by way of limitation, each node of the input layer 710 may be connected to one of more nodes of the hidden layer 720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 7 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 7 depicts a connection between each node of the input layer 710 and each node of the hidden layer 720, one or more nodes of the input layer 710 may not be connected to one or more nodes of the hidden layer 720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 720 may comprise the output of one or more nodes of the input layer 710. As another example and not by way of limitation, the input to each node of the output layer 750 may comprise the output of one or more nodes of the hidden layer 740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max (0, $s_k$), or any other suitable function $F_k(s_k)$, where s k may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 725 between the node 705 and the node 715 may have a weighting coefficient of 0.4, which may indicate that 0.4 multiplied by the output of the node 705 is used as an input to the node 715. As another example and not by way of limitation, the output $y_k$ of node k may be $y_k = F_k(s_k)$, where $F_k$ may be the activation function corresponding to node k, $s_k = \Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 700 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 560, a client system 530, a third-party system 570, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 560 or shared with other systems (e.g., a third-party system 570). Although this disclosure describes using particular privacy settings in a particular manner, this disclosure contemplates using any suitable privacy settings in any suitable manner.

In particular embodiments, the social-networking system 560 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 560 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 562 may be authorization/privacy servers for enforcing privacy settings. In response to a request from a user (or other entity) for a particular object stored in a data store 564, the social-networking system 560 may send a request to the data store 564 for the object. The request may identify the user associated with the request and the object may be sent only to the user (or a client system 530 of the user) if the authorization server determines that the user is authorized to access the object based on the privacy settings associated with the object. If the requesting user is not authorized to access the object, the authorization server may prevent the requested object from being retrieved from the data store 564 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 560, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 560 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 560 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 560 may access such information in order to provide a particular function or service to the first user, without the social-networking system 560 or having access to that information for any other purposes. Before accessing, storing, or using such objects or information, the social-networking system 560 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 560.

In particular embodiments, a user may specify whether particular types of objects or information associated with the first user may be accessed, stored, or used by the social-networking system 560. As an example and not by way of limitation, the first user may specify that images sent by the first user through the social-networking system 560 may not be stored by the social-networking system 560. As another example and not by way of limitation, a first user may specify that messages sent from the first user to a particular second user may not be stored by the social-networking system 560. As yet another example and not by way of limitation, a first user may specify that all objects sent via a particular application may be saved by the social-networking system 560.

In particular embodiments, privacy settings may allow a first user to specify whether particular objects or information associated with the first user may be accessed from particular client systems 530 or third-party systems 570. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 560 may provide default privacy settings with respect to each device, system, or application, and/or the first user may be prompted to specify a particular privacy setting for each context. As an example and not by way of limitation, the first user may utilize a location-services feature of the social-networking system 560 to provide recommendations for restaurants or other places in proximity to the user. The first user's default privacy settings may specify that the social-networking system 560 may use location information provided from a client system 530 of the first user to provide the location-based services, but that the social-networking system 560 may not store the location information of the first user or provide it to any third-party system 570. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 560 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 560. The user's privacy settings may specify that such information may be used only for particular processes, such as authentication, and further specify that such information may not be shared with any third-party system 570 or used for other processes or applications associated with the social-networking system 560. As another example and not by way of limitation, the social-networking system 560 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 570 or used by other processes or applications associated with the social-networking system 560.

Systems and Methods

Figure 8:
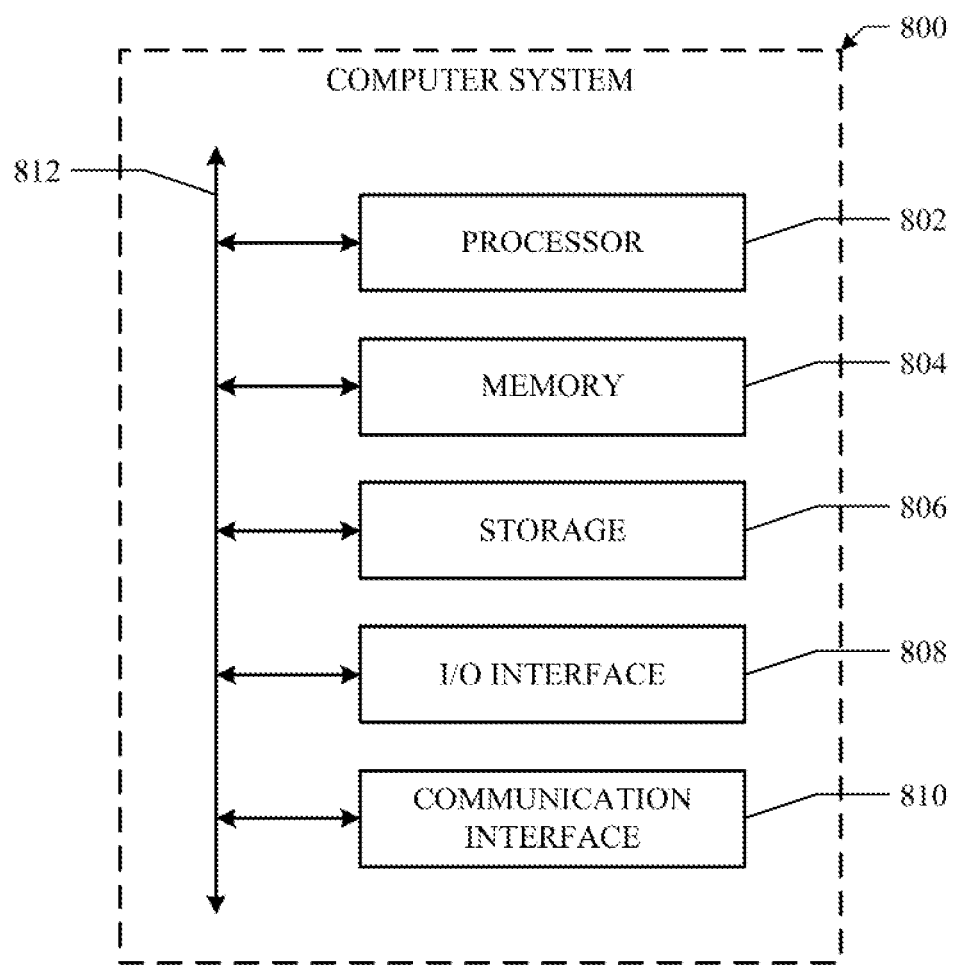
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, implemented by a computing system, comprising:
    receiving code comprising a plurality of snippets programmed to manipulate objects in an extended reality environment;
    using a machine-learning model to learn to identify a plurality of coding patterns from the plurality of snippets programmed to manipulate;
    extracting, based on the plurality of coding patterns, object terms and relationships between the object terms used in the plurality of snippets, wherein the extracted object terms include meaningless words;
    generating an ontology for a natural language model based on the object terms and the relationships, wherein the ontology is configured to be used by the natural language model to parse a natural language input into intents and slots;
    receiving, using the natural language model, the natural language input, wherein the natural language input comprises one re phrases;
    parsing, using the natural language model, each of the one or more phrases of the natural language input to determine the intents and the slots according to the ontology; and
    generating application programming interface (API) requests according to the intents and the slots parsed using the natural language model, wherein each of the API requests are atomic.

2. The method of claim 1, wherein the ontology generated based on the object terms and the relationships comprises a plurality of actions and a plurality of objects.

3. The method of claim 2, wherein the ontology defines that the plurality of actions operates on one or more of the plurality of objects.

4. The method of claim 2, wherein the ontology further comprises a plurality of attributes, wherein the ontology defines that the plurality of objects comprises one or more of the plurality of attributes.

5. The method of claim 1, implemented by a computing system, further comprising:
    determining, using the natural language model, for words of the one or more phrases of the natural language input, a suggested meaning, wherein the suggested meaning corresponds to the object terms of the ontology.

6. The method of claim 1, implemented by a computing system, further comprising:
    extracting, from the plurality of snippets programmed to manipulate objects, a particular code snippet associated with a particular object term of the ontology, wherein the particular code snippet is accessible when the particular object term is identified as the intents and the slots by the natural language model.

7. The method of claim 1, wherein the meaningless words include gibberish indicating a customized item in world building of an extended reality environment.

8. One or more computer-readable non-transitory storage media embodying software that is operable when executed to:

receive code comprising a plurality of snippets programmed to manipulate objects in an extended reality environment;
use a machine-learning model to learn to identify a plurality of coding patterns from the plurality of snippets programmed for manipulating objects;
extract, based on the plurality of coding patterns, object terms and relationships between the object terms used in the plurality of snippets, wherein the extracted object terms include meaningless words;
generate an ontology for a natural language model based on the object terms and the relationships, wherein the ontology is configured to be used by the natural language model to parse a natural language input into intents and slots,
receive, using the natural language model, the natural language input, wherein the natural language input comprises one or more phases;
parse, using the natural language model, each of the one or more phrases of the natural language input to determine the intents and the slots according to the ontology; and
generate application programming interface (API) requests according to the intents and the slots parsed using the natural language model, wherein each of the API requests are atomic.

9. The media of claim 8, wherein the ontology generated based on the object terms and the relationships comprises a plurality of actions and a plurality of objects.

10. The media of claim 9, wherein the ontology defines that the plurality of actions operates on one or more of the plurality of objects.

11. The media of claim 9, wherein the ontology further comprises a plurality of attributes, wherein the ontology defines that the plurality of objects comprises one or more of the plurality of attributes.

12. The media of claim 8, wherein the software is further operable when executed to:
determine, using the natural language model, for words of the one or more phrases of the natural language input, a suggested meaning, wherein the suggested meaning corresponds to the object terms of the ontology.

13. The media of claim 8, wherein the software is further operable when executed to:
extract, from the plurality of snippets programmed to manipulate objects, a particular code snippet associated with a particular object term of the ontology, wherein the particular code snippet is accessible when the particular object term is identified as the intents and the slots by the natural language model.

14. A system comprising:
one or more processors; and
one or more computer-readable non-transitory storage media coupled to one or more of the processors and comprising instructions operable when executed by one or more of the processors to cause the system to:
receive code comprising a plurality of snippets programmed for to manipulate objects in an extended reality environment;
use a machine-learning model to learn to identify a plurality of coding patterns from the plurality of snippets programmed for to manipulate objects;
extract, based on the plurality of coding patterns, object terms and relationships between the object terms used in the plurality of snippets, wherein the extracted object terms include meaningless words;
generate an ontology for a natural language model based on the object terms and the relationships, wherein the ontology is configured to be used by the natural language model to parse a natural language input into intents and slots;
receive, using the natural language model, the natural language input, wherein the natural language input comprises one or more phrases;
parse, using the natural language model, each of the one or more phrases of the natural language input to determine the intents and the slots according to the ontology; and
generate application programming interface (API) requests according to the intents and the slots parsed using the natural language model, wherein each of the API requests are atomic.

15. The system of claim 14, wherein the ontology generated based on the object terms and the relationships comprises a plurality of actions and a plurality of objects, wherein the ontology defines that the plurality of actions operates on one or more of the plurality of objects.

16. The system of claim 15, wherein the ontology further comprises a plurality of attributes, wherein the ontology defines that the plurality of objects comprises one or more of the plurality of attributes.

17. The system of claim 14, wherein the processors are further operable when executing the instructions to:
determine, using the natural language model, for each words of the one or more phrases of the natural language input, a suggested meaning, wherein the suggested meaning corresponds to the object terms of the ontology.

18. The system of claim 14, wherein the processors are further operable when executing the instructions to:
extract, from the plurality of snippets programmed for to manipulate objects, a particular code snippet associated with a particular object term of the ontology, wherein the particular code snippet is accessible when the particular object term is identified as the intents and the slots by the natural language model.

* * * * *